United States Patent [19]
Trussart

[11] Patent Number: 6,009,894
[45] Date of Patent: Jan. 4, 2000

[54] AIRFLOW RATE REGULATING DEVICE

[75] Inventor: Michel Trussart, Ile Bizard, Canada

[73] Assignee: Les Systems Et Procedes Dynapharm, Inc., Canada

[21] Appl. No.: 09/178,270

[22] Filed: Oct. 23, 1998

[51] Int. Cl.$^7$ .................................................. G05D 16/04
[52] U.S. Cl. .................. 137/114; 137/527.8; 137/614.2; 137/907
[58] Field of Search ................................ 137/114, 512.1, 137/513.3, 527.8, 614.2, 907

[56] References Cited

U.S. PATENT DOCUMENTS

| | | | |
|---|---|---|---|
| 4,413,644 | 11/1983 | Woodward | 137/907 |
| 4,494,564 | 1/1985 | Lukacz | 137/527.8 |
| 4,657,178 | 4/1987 | Meckler . | |
| 4,705,066 | 11/1987 | Gut et al. . | |
| 4,979,883 | 12/1990 | Neward | 137/114 |
| 5,081,913 | 1/1992 | Gervais . | |
| 5,344,364 | 9/1994 | Michlovic . | |
| 5,720,658 | 2/1998 | Belusa . | |

*Primary Examiner*—Stephen M. Hepperle
*Attorney, Agent, or Firm*—Fulwider Patton Lee & Utecht, LLP

[57] ABSTRACT

An airflow rate regulating device which is installed in a vacuum unit that collects contaminants from a processing station in a controlled space. This device enables a vacuum unit to maintain a continuous suction of contaminant particles from a processing station when there are pressure variations in the controlled space. The airflow rate regulating device is mounted in a suitable cabinet 88 and connected to a vacuum source. The airflow rate regulating device has a casing divided into two chambers separated by a wall having an passageway through which air flows from one chamber to the next. Each chamber features an airflow rate regulation valve comprising a movable member extending across the flow of air passing through the casing, that can be adjusted using counterweights. When a pressure disturbance occurs in the controlled room from a door opening, or when a hose leading the contaminant source is disconnected, the airflow rate regulation valves react to maintain sufficient vacuum pressure at the contaminants source. Since the airflow rate regulating device is mechanical, its response time to pressure is nearly instantaneous.

14 Claims, 9 Drawing Sheets

AIRFLOW RATE REGULATING DEVICE

FIELD OF THE INVENTION

The present invention relates to the art of airflow regulation devices. In particular, the invention finds applications in airflow rate control devices that may be typically used in enclosures to provide a source of suction to a processing station and at the same time assist in maintaining the enclosure at a negative pressure relative to an adjacent room. Such installations are usually found in pharmaceutical plants where it is essential to avoid chemical substances being released outside a certain enclosure.

BACKGROUND OF THE INVENTION

In many applications, it is desirable to control the air pressure within a space such as in so called <<clean rooms>> used in laboratories, biotech, biomedical, hospital, cosmetic, food processing, research center, semiconductor industries, etc . . . . For instance, pharmaceutical installations that produce medicinal tablets are required by regulation to confine the tablet manufacturing equipment within a closed space and provide an air filtration system capable of establishing in the closed space negative air pressure in the space such that when an access door is opened airborne particulate matter will have a tendency to remain in the space.

Traditional air filtration systems have drawbacks. Perhaps, the most acute one is the inability of the system to react rapidly enough to air pressure variations in the space (occurring when a door is opened) to stabilize the air pressure to its nominal value. This slow response time is the result of the strategy employed to regulate the air pressure. More particularly, prior art air filtration systems rely on electric actuators to alter air flow in order to provide the pressure control function. Such electric actuators, are usually slow to react which translates into a lengthy response time for the overall system.

Therefore there exists a need in the industry to provide novel system and components that alleviate the disadvantages of prior art air filtration systems.

OBJECTS AND STATEMENT OF THE INVENTION

It is thus an object of the invention to provide an improved airflow rate regulating device that alleviates at least some of the drawbacks associated with prior art air filtration systems.

As embodied and broadly described herein, the invention provides an airflow rate regulating device, comprising:
  a first and a second chambers;
  an air flow passageway between said first and second chambers establishing a fluid communicative relationship between said chambers.
  said first chamber including a main port for connection to a source of vacuum, said main port permitting air to be drawn from said first chamber under the effect of negative pressure established by the source of vacuum;
  said second chamber including a first air inlet and a second air inlet for admitting air to said second chamber;
  said first air inlet including a first airflow rate regulation valve to meter a rate at which air passes through said first inlet, said airflow rate regulation valve including a movable member extending across a flow of air though said first inlet and capable to acquire a plurality of positions corresponding to different air flow rates through said first inlet;
  a second air flow regulation valve in said air flow passageway to meter a rate at which air passes through said air flow passageway, said airflow rate regulation valve including a movable member extending across a flow of air though said air flow passageway and capable to acquire a plurality of positions corresponding to different air flow rates through air flow passageway.

Other objects and features of the invention will become apparent by reference to the following description and the drawings.

BRIEF DESCRIPTION OF THE DRAWINGS

A detailed description of the preferred embodiments of the present invention is provided herein below, by way of example only, with reference to the accompanying drawings, in which.

Figure 1:
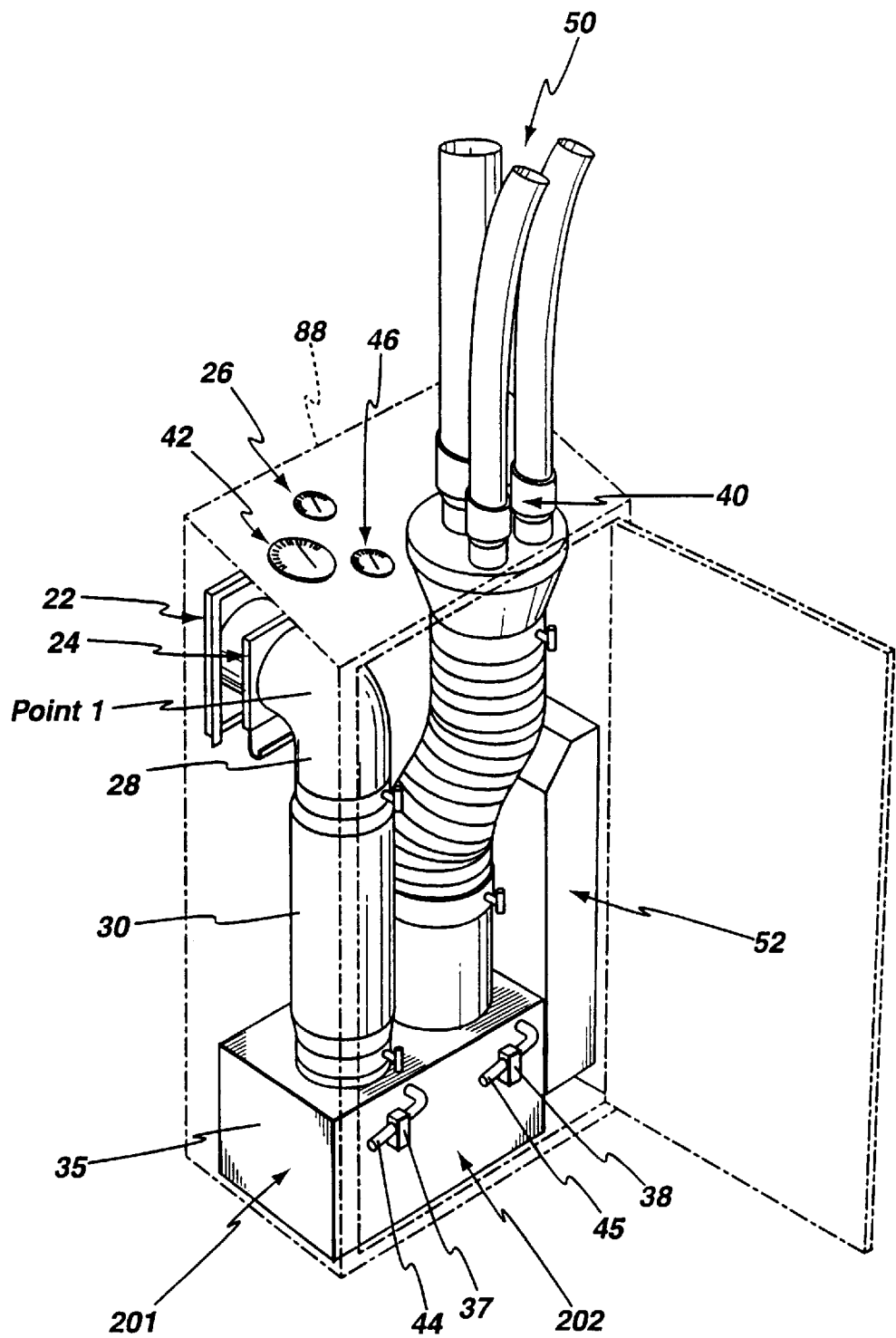
FIG. 1 is a perspective view of a cabinet shown in dotted lines in which the airflow rate regulating device according to a preferred embodiment of the invention is mounted.

In the drawings, preferred embodiments of the invention are illustrated by way of examples. It is to be expressly understood that the description and drawings are only for the purpose of illustration and are an aid for understanding. They are not intended to be a definition of the limits of the invention.

Detailed Description of Preferred Embodiments

Figures 2, 2A:
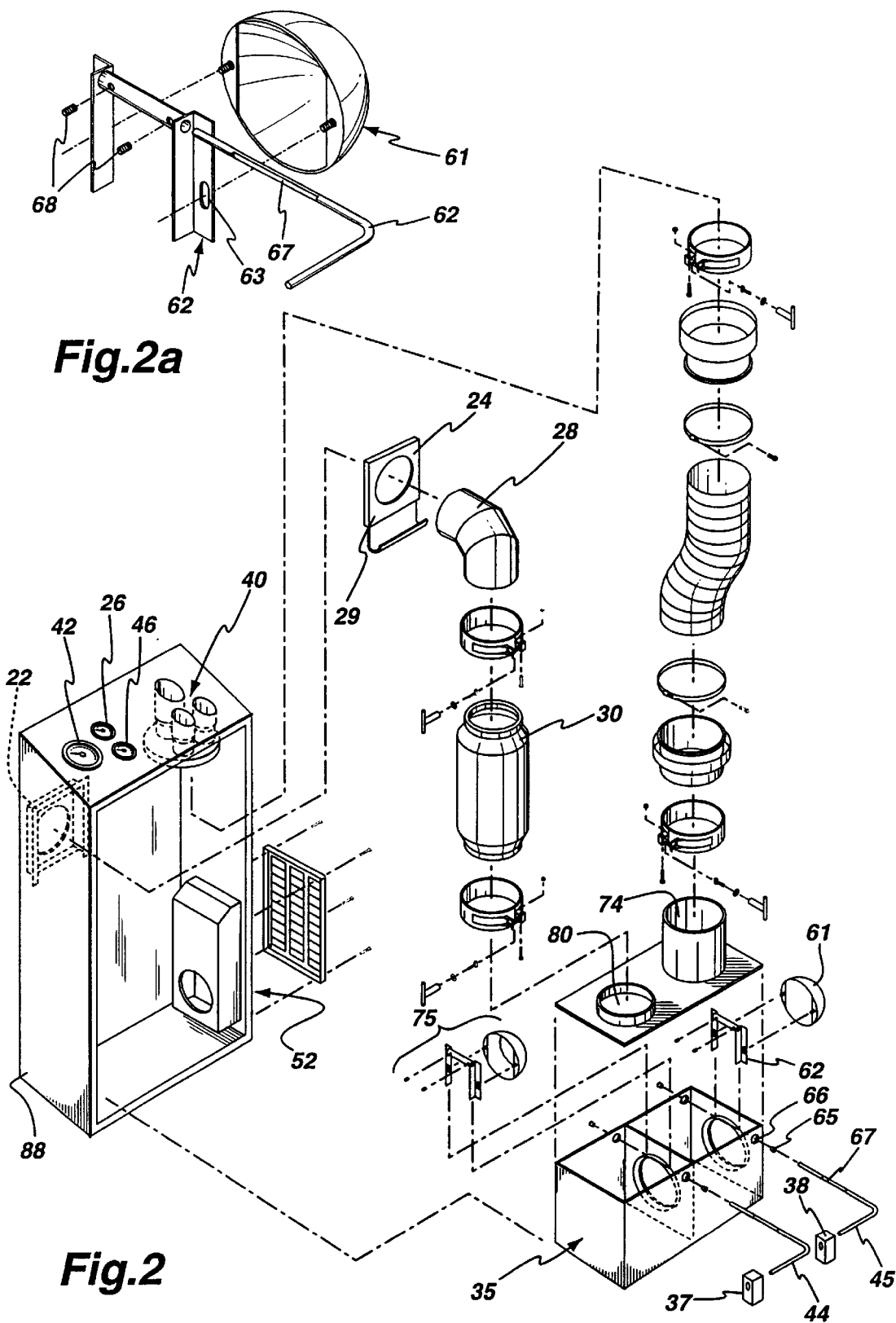
FIG. 2 is an exploded perspective view of the device depicted in FIG. 1.
FIG. 2a is an enlarged perspective view of the movable valve member of an airflow rate regulation valve.

FIGS. 1 and 2 of the drawings illustrate the airflow rate regulating device constructed in accordance with the preferred embodiment of the invention. The airflow rate regulating device 35 is mounted in a suitable cabinet 88 and it is connected to a vacuum source at central inlet 22 of the cabinet 88 through elbow 28 and conduit 30. Typically, the airflow rate regulating device 35 is integrated in an air filtration system and the vacuum source is a fan unit or a suitable pump designed to transport air through the filtration system. A negative pressure is established at the main port 80 of the airflow rate regulating device 35 by the vacuum source. A sliding gate valve 24 located immediately next to the central inlet 22 allows an operator to set the initial vacuum pressure at the main port 80 of the airflow rate regulating device 35 by adjusting the opening of the sliding valve 24.

Figure 3:
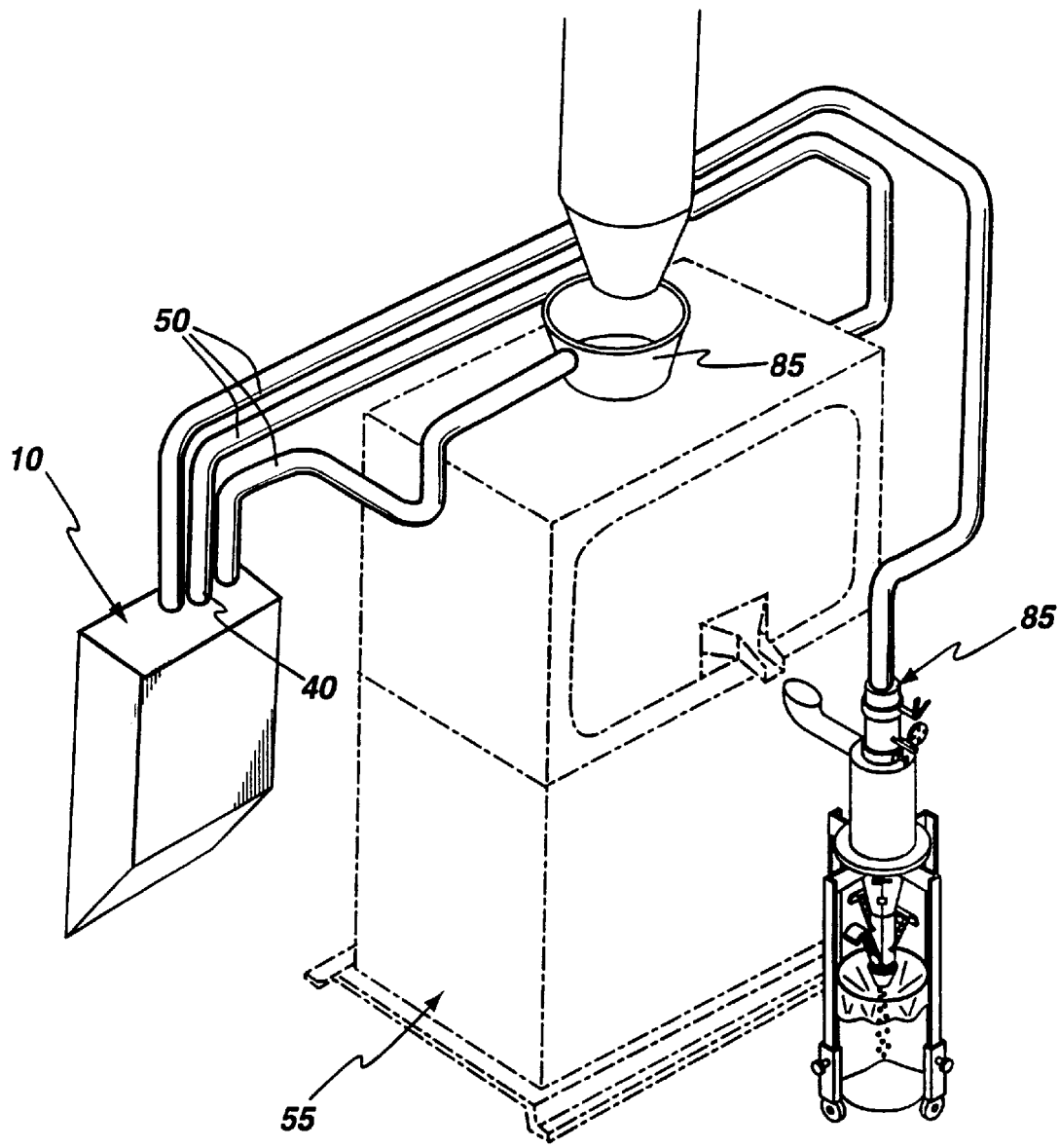
FIG. 3 is a perspective view illustrating the cabinet in which is mounted the airflow rate regulating device, illustrating flexible hoses connecting the airflow rate regulating device to processing stations.

FIG. 3 illustrates a typical unit installed in a controlled room. The flexible hoses 50 are coupled to outer part of service ports 40 of the unit and are routed to a source of contaminants or multiple sources of contaminants of a processing station 55. The contaminants produced by the processing station 55 are drawn up and collected by the vacuum pressure created at the end of the flexible hoses 50. As can be seen in FIGS. 1 and 2, the airflow rate regulating device 35 draws air through two sources. The first source being through air inlet 74 which is connected to the service ports 40 and the second source being through air inlet 72 located on the side of the airflow rate regulating device 35 and connected to the ambient room air inlet 52 of the cabinet 88.

Figure 4:
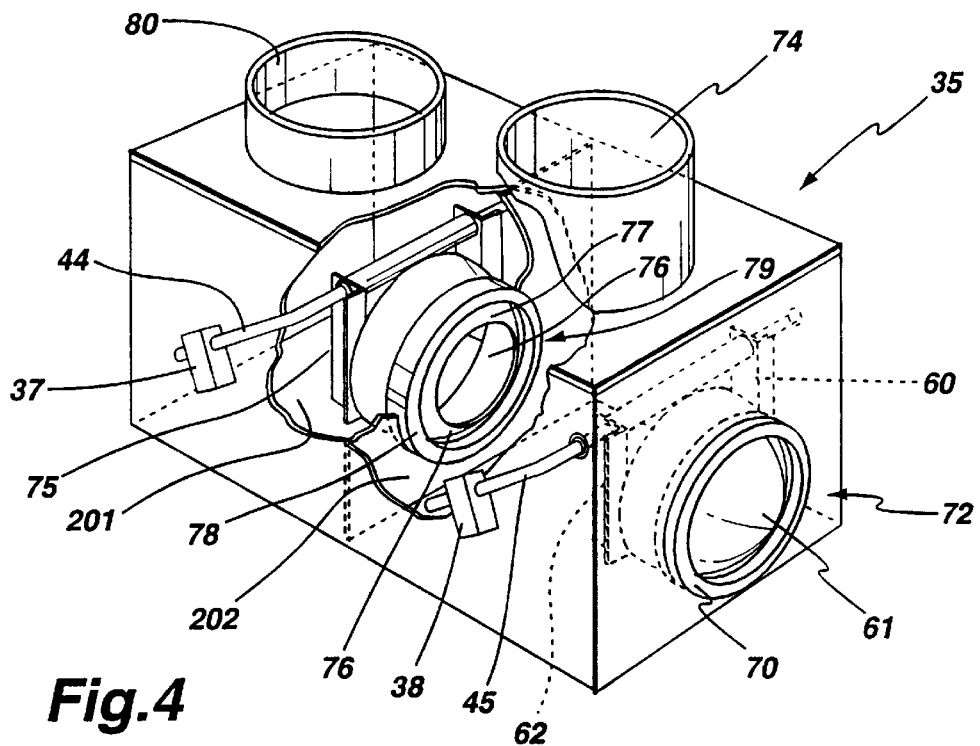
FIG. 4 is a perspective view of the airflow rate regulating device according to the invention, some components being cut-away to illustrate internal parts.
Figure 4A:
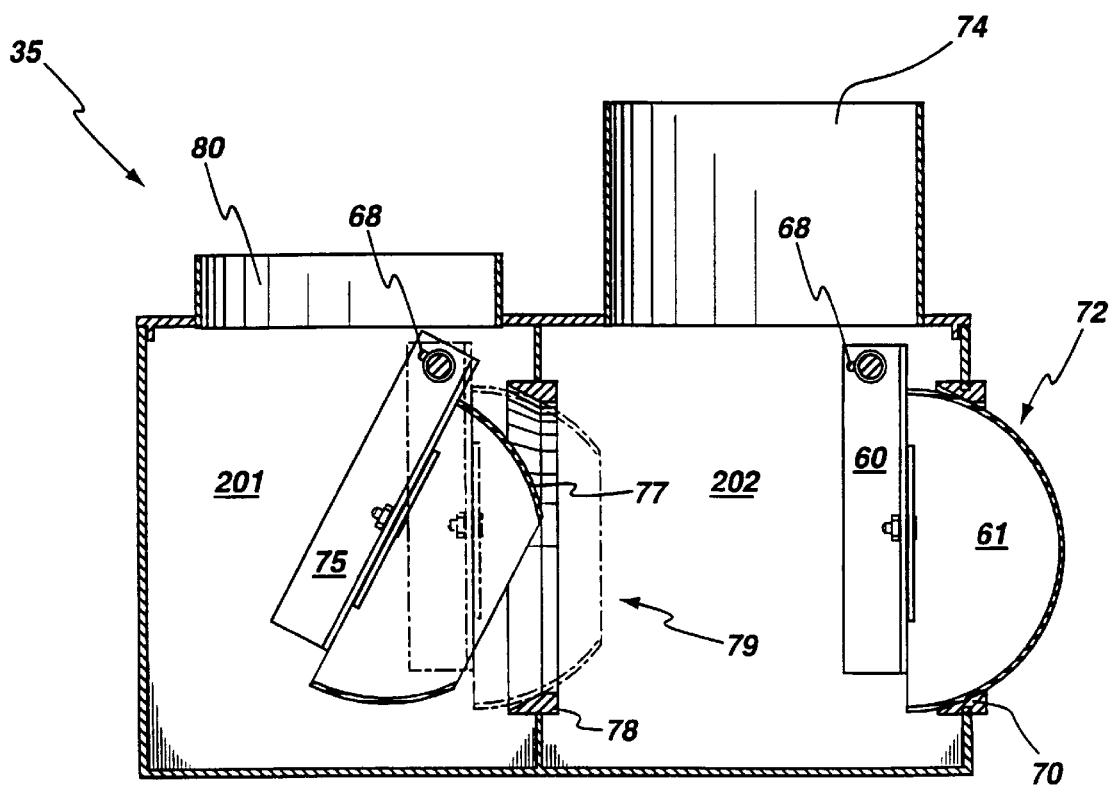
FIG. 4a is a cross-sectional view of the airflow rate regulating device shown in FIG. 4.

Referring to FIGS. 2 and 2a, and more specifically to FIGS. 4 and 4a, the airflow rate regulating device 35 has a casing divided into two chambers 201 and 202 separated by a wall having an passageway 79 through which air flows from chamber 202 to chamber 201. The first chamber 201 transports the air flow passing through the airflow rate regulating device 35 and features an airflow rate regulation valve 75 comprising a movable member 77 extending across the flow of air passing through the passageway 79, that can be adjusted using counterweight 37. The counterweight 37 allows adjustment of the air flow i.e. the actual volume of air per unit of time going through the airflow rate regulating device 35.

The second chamber 202 regulates the vacuum pressure at the service ports 40. The second chamber 202 features an airflow rate regulation valve 60 comprising a movable member 61 extending across the flow of air passing through the air inlet 72, that can be adjusted using the counterweights 38. The adjustment of the counterweight 38 biases the movable member and effectively regulates the amount of air coming from air inlet 72 and air inlet 74 so that a constant vacuum level can be maintained at the service ports 40.

The airflow rate regulating valve 60 is an assembly comprising a movable member 61 in the form of a semi-spherical damper adjustably mounted on an inverted U-shaped frame 62 which has two grooved apertures 63 to adjustably fasten the movable member 61 to the U-shaped frame 62. The frame 62 is mounted on lever 45 which acts as a mechanical biasing member for biasing the movable member 61 towards a certain position. Lever 45 passes through the upper portion of frame 62. Lever 45 also passes through the case of the airflow rate regulating device 35 and is held in place by two bushing 65 installed in the apertures 66 of the airflow rate regulating device 35. Lever 45 preferably features a flattened area 67 on which the two fasteners 68 can lock lever 45 onto frame 62. Once the lever 45 and the frame 62 are locked together, final adjustment of the position of the movable member 61 in relation to frame 62 can be made by positioning the movable member 61 in seat 70 of the air inlet 72 in such a way that the movable member 61 embraces the entire contour of the seat 70, and then tightening the two fasteners 68 which hold the movable member 61 onto frame 62. The seat 70 of air inlet 72 is made of a softer material than the movable member 61, preferably a plastic or a rubber, and the inner contour of seat 70 is bevel shaped to mate semi-spherical body of the movable member 61. The airflow rate regulation valve 60 moves like a pendulum rotating about the axis defined by the lever 45.

The lever 45 protrudes outside the airflow rate regulating device 35 and is shaped like an "L". On the outside portion of lever 45 is mounted the counterweight 38 which can slide on the shaft of lever 45 to adjust the amount of torque it generates on the movable member 61. The amount of torque determines the level of bias. The airflow rate regulation valve 60 effectively controls the amount of air drawn from air inlet 72 in response to pressure variations at the service ports 40.

The first chamber 201 also comprises an airflow rate regulation valve 75 constructed and assembled in same manner as described above for the airflow rate regulation valve 60 but with one noticeable difference in the design of the body of the movable member 77. The body of the movable member 77 has a circular aperture 76 in its center. Since chamber 201 regulates the air flow passing through the airflow rate regulating device 35, a minimum quantity of air must go through the airflow rate regulation valve 75 and the circular aperture 76 provides for that minimum amount of airflow. Even with the movable member 77 fully seated against seat 78 of the passageway 79, a minimum quantity of air is able to pass from second chamber 202 to first chamber 201 by way of this circular aperture 76. Again, the airflow rate regulation valve 75 moves like a pendulum rotating about the axis defined by the lever 44 and provides a counterweight 37 which can slide on the shaft of lever 44 to adjust the amount of torque it generates on the movable member 77.

Referring to FIGS. 1, 4 and 4a; in operation, the airflow rate regulating device 35 draws air and contaminants from the flexible hoses 50 at a set vacuum pressure and a certain quantity of air is also drawn from the ambient room air inlet 52 at room pressure. When a pressure disturbance occurs, whether in the controlled room from a door opening or when one of the flexible hoses 50 is disconnected, the airflow rate regulation valve 60 which regulates the amount of air drawn from the two air inlets (72 and 74) reacts. The counterweight 38 setting provided for a precise pressure differential at the service ports 40. Now that the pressure has risen in the controlled room and therefore at the processing machine end of the flexible hoses 50, the pressure differential established at the service ports 40 in steady state thereby decreases. The torque exerted by counterweight 38 on the movable member 61 being a constant, forces the movable member 61 down so as to restrict the airflow coming from the first air inlet 72 of the ambient room air inlet 52. By reducing the amount of air drawn from first air inlet 72, more air must be drawn from the flexible hoses 50 (air inlet 74) thereby re-establishing the pressure differential previously set at the service ports 40. The advantage of this mechanism is that its response time is nearly zero; the torque generated by counterweight 38 is set and balanced against the pressure differential established in steady state at the service ports 40 so that if a pressure variations occurs in the controlled room, the airflow rate regulation valve 60 will open or close the first air inlet 72 in order to keep these two forces (torque of the counterweight and pressure differential pull in the opposite direction) in equilibrium.

To maintain a constant air flow, the airflow rate regulation valve 75 is set using counterweight 37. Again if a pressure disturbance occurs in the controlled room from a door opening, the airflow rate regulation valve 75 will react by restricting the passageway 79. The setting of counterweight 37 uses the same two forces described above for counterweight 38 so that when pressure rises in the controlled room as in this example, the equilibrium established in steady state is disturbed and the counterweight 37 forces the movable member 77 down so as to restrict or close the passageway 79 in order to reestablish the equilibrium between the pressure differential at main port 80 and the torque of counterweight 37. Since the airflow rate regulation valve 75 has a circular aperture 76 in its center and is located downstream from the airflow rate regulation valve 60, its modulations are usually smaller than the modulations of the airflow rate regulation valve 60.

The static pressure maintenance within the controlled room may also be assisted by the airflow rate regulating device 35. Because of the constant exhausted air flow it generates, the airflow rate regulating device 35 can and does assist in maintaining the pressure differential between the controlled room and the outside of the room. The setting point of the airflow rate regulating device 35 is such, that when the worst case condition occurs, i.e. when doors of the process room are open, this room will remain at a point below the static pressure outside of the controlled space to ensure that such contaminants will not migrate outside of the controlled space. In case of complete failure of the central ventilation system, the airflow rate regulating device 35 is capable of maintaining, at least partially, the lower static pressure of the controlled room.

Also, an interesting feature of the airflow rate regulating device 35 is the fact that, with its capacity to maintain constant vacuum pressure at the inlet of the flexible hoses 50, special dust catch pans 85 as shown in FIG. 3 can be installed at the collecting points of the processing station 55 without disturbing the process conditions thereby allowing an optimum removal of all contaminants directly at the sources.

As an added feature, the casing 88 as well as the conduits leading to the airflow rate regulating device 35 are lined with an acoustic material which partially absorbs and dampens the sound created by the air flow though the airflow rate regulation device 35. The device so equipped is very quiet and does not expose people working next to it to high pitch sound. Since the airflow rate regulating device 35 does not have a motor and rely on a vacuum source located downstream, it is a very quiet device.

Figure 5:
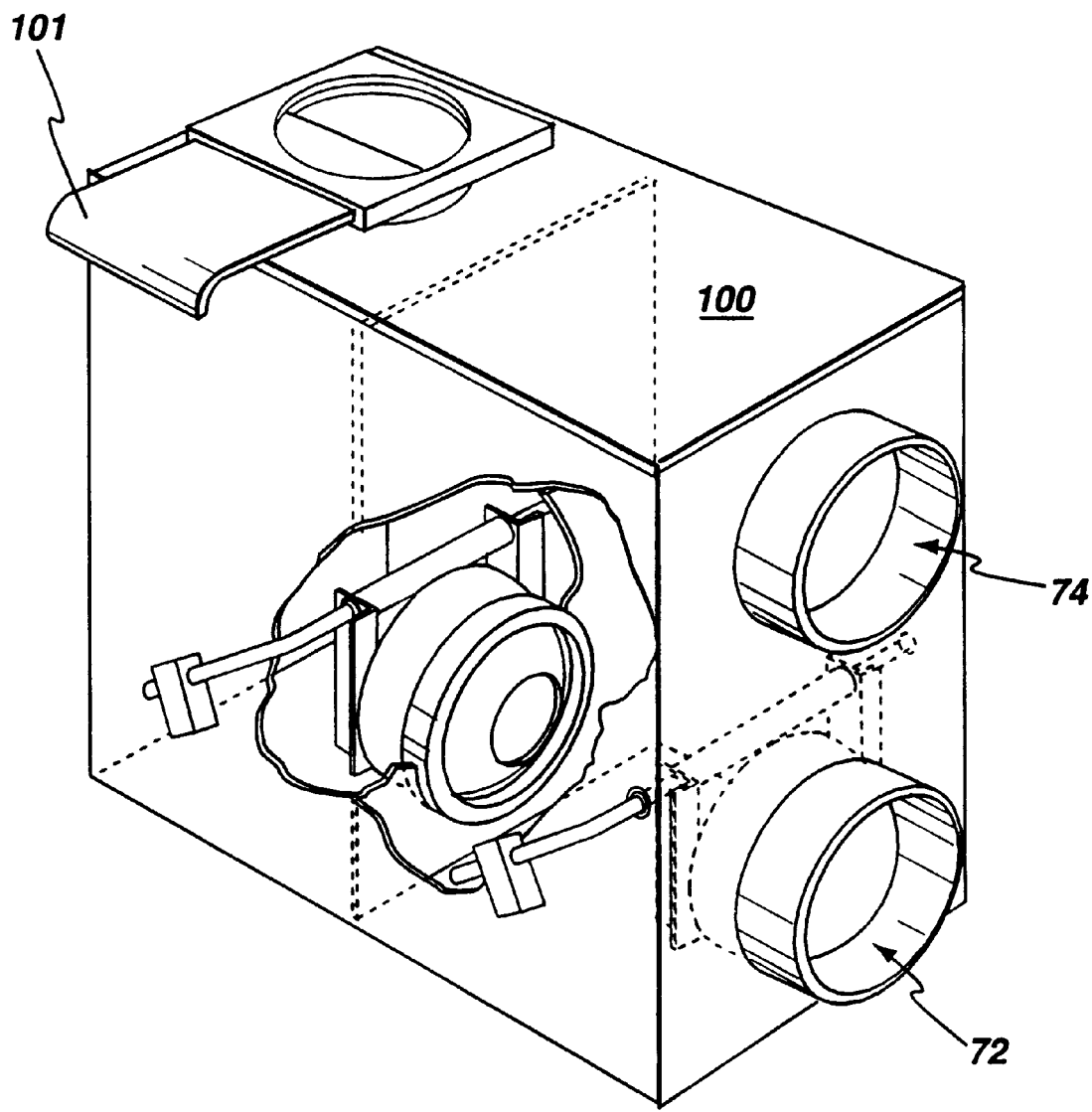
FIG. 5 is a perspective view of a second embodiment of the airflow rate regulating device according to the invention.
Figure 6:
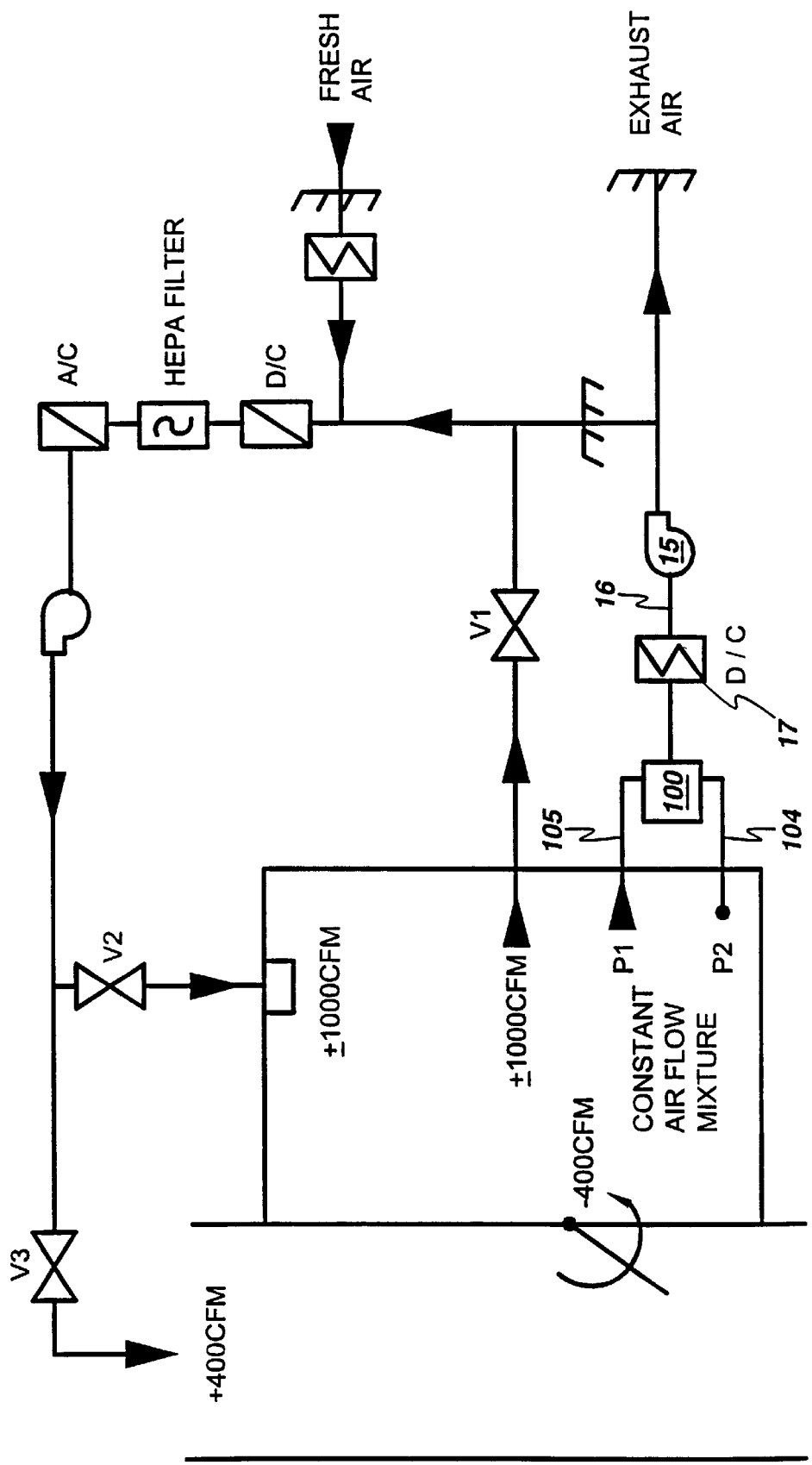
FIG. 6 is a block diagram of an air filtration system utilizing the air flow regulating device according to the second embodiment installed in a controlled room.
Figure 7:
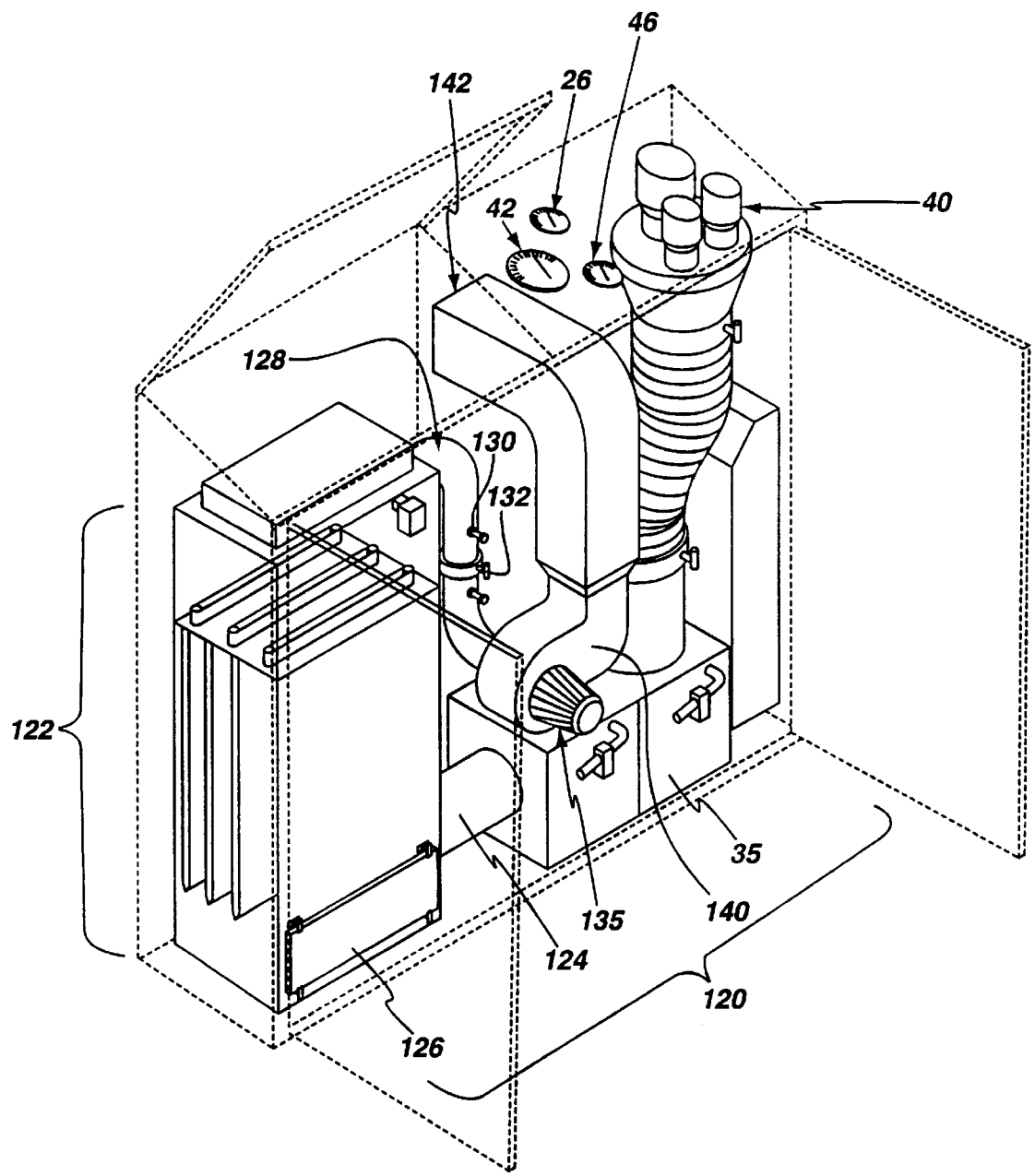
FIG. 7 is a perspective view of an airflow rate regulating device in accordance with a third embodiment.
Figure 8:
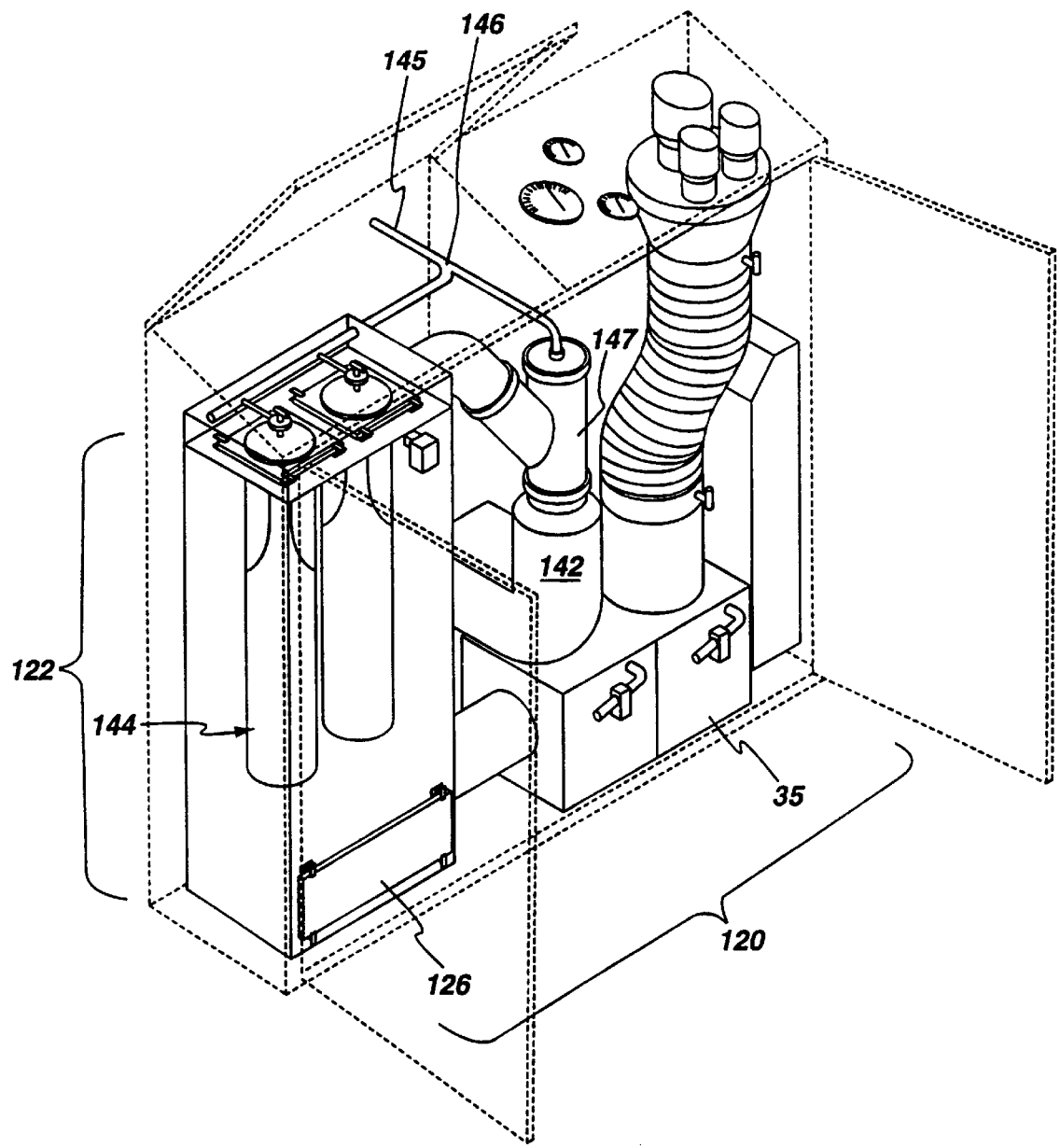
FIG. 8 is a perspective view of a variant of the third embodiment of the airflow rate regulating device according to the invention.

The present invention may be assembled and constructed as a complete surface model as represented in FIGS. 7 and 8, as a regular unit 10 as represented in FIGS. 1, 2 and 3 or as a dissimulated model as represented in FIGS. 5 and 6. The dissimulated variant 100 of the present invention is reduced to the airflow rate regulating device 35 with again two air inlets 72 and 74. The second air inlet 74 is located on the side of the dissimulated variant 100 instead of above. A flexible conduit 104 is coupled to the second air inlet 74 and collects air and contaminants from a processing station. The first air inlet 72 draws its air from the controlled room itself through connection 105. A sliding gate valve 101 is provided to adjust the initial vacuum pressure. The dissimulated variant 100 of the present invention can be installed behind the walls of the controlled room as shown in FIG. 6. The vacuum pressure is created by the vacuum source 15 located downstream of the exhaust conduit 16 and a dust collector 17 is inserted into the exhaust conduit 16 between the vacuum pump 15 and the dissimulated variant 100 to filter the contaminants collected from the processing station.

Figure 9:
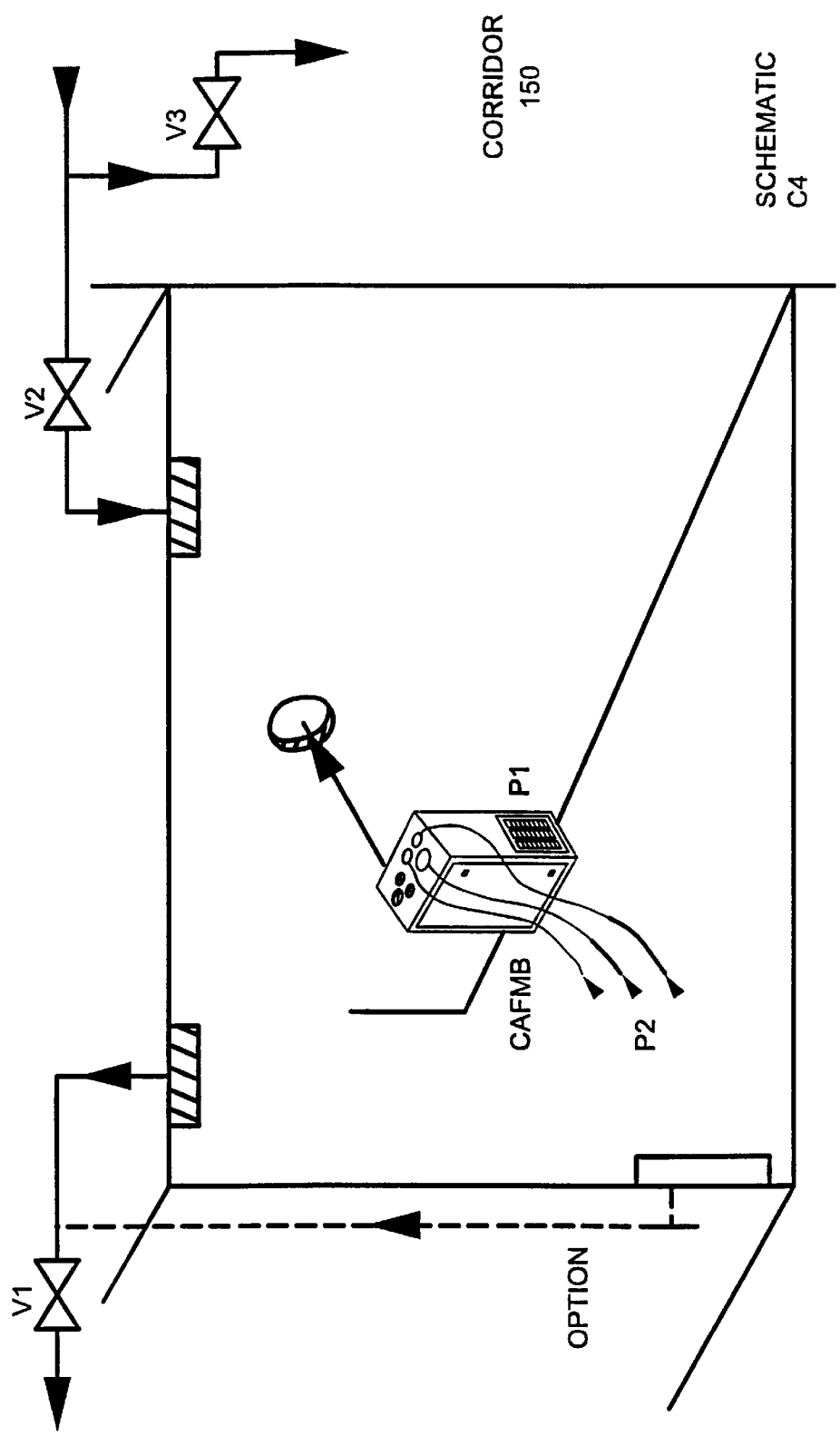
FIG. 9 is a schematical view of the airflow rate regulating device in accordance with the third embodiment of the invention installed in a controlled room.

A complete surface model 120 is illustrated in FIGS. 7, 8 and 9. It features the same basic characteristics as the regular unit 10 depicted in FIGS. 1 to 3 but it has been modified to accommodate the filtering unit 122. Contaminants are collected through flexible hoses routed to the processing station in the same manner as the regular unit; the airflow rate regulating device 35 controls air flow and vacuum pressure at the service ports 40 but instead of being evacuated immediately, air and contaminants are evacuated through a side main port 80 of the airflow rate regulating device 35 linked to a conduit 124 which leads to a filtering unit 122 where contaminants are removed from the airflow and trapped. The contaminants fall in a bag (not shown) positioned at the bottom of the filtering unit 122 which can be removed through the access door 126. Clean air exits the filtering unit 122 and passes through conduit 128 which features a sliding gate valve 132 and leads to a vacuum source 140. Adjustment of the initial vacuum pressure is achieved by opening or closing the sliding valve 132.

This complete surface model 120 features its own power source 135. The power source 135 is preferably an electric motor coupled to a fan blower, a compressed air turbine or a compressed air venturi. Air from conduit 128 passing through sliding valve 132 is drawn by the fan 140 and evacuated outside the complete surface model 120 through the silencer air outlet 142. The complete surface model 120 has the advantage of being completely self-sufficient. As shown in FIG. 9, the clean exhaust air is evacuated at a higher pressure than the previously collected air and is preferably delivered in the adjacent corridor 150 or the next room to assist in maintaining the necessary pressure differential between the outside of the controlled room and the controlled room.

FIG. 8 represent a variant of the complete surface model 120. The filtering unit 122 uses a compressed air filtering cartridge 144 as a means to collect contaminants from the airflow rate regulating device 35. As a variant of the vacuum source, this particular model features a compressed air system. The initial vacuum pressure is derived from compressed air introduced into the system at air inlet pipe 145 where it is split at intersection 146. A first portion of compressed air is routed directly into exhaust conduit 147 and through the silencer 142. A second portion of compressed air is routed into the compressed air filtering cartridge 144. The necessary vacuum to run the airflow rate regulating device 35 is established by the compressed air evacuated directly into exhaust conduit 147. As the compressed air rapidly exits conduit 147, it creates a vacuum pressure behind this point that is sufficient to act as a proper vacuum source to run the airflow rate regulating device 35. This arrangement eliminates the use of a power source in the complete surface model 120. Of course, this compressed air arrangement can be used in any variants of the airflow rate regulating device 35, may it be the complete surface models 120, the regular unit 10 or the dissimulated model 100. Each may be modified to function with a compressed air arrangement.

The exhausted air passing through the airflow rate regulating device 35, which is a mixture of contaminated source captured air from the process and ambient air from the controlled room, can be evacuated through a central ventilation system after filtration, returned into the central ventilation system after filtration, or re-circulated, after local filtration, into adjacent rooms or corridors to help in the pressurization of these rooms or corridors.

The above description of preferred embodiments should not be interpreted in a limiting manner since other variations, modifications and refinements are possible within the spirit and scope of the present invention. The scope of the invention is defined in the appended claims and their equivalents.

I claim:

1. An airflow rate regulating device, comprising:

a first and a second chambers;

an airflow passageway between said first and second chambers establishing a fluid communicative relationship between said chambers.

said first chamber including a main port for connection to a source of vacuum, said main port permitting air to be drawn from said first chamber under the effect of negative pressure established by the source of vacuum;

said second chamber including a first air inlet and a second air inlet for admitting air to said second chamber;

said first air inlet including a first airflow rate regulation valve to meter a rate at which air passes through said first inlet, said airflow rate regulation valve including a movable member extending across a flow of air through said first inlet and capable to acquire a plurality of positions corresponding to different air flow rates through said first inlet;

a second airflow rate regulation valve in said airflow passageway to meter a rate at which air passes through said airflow passageway, said airflow rate regulation valve including a movable member extending across a flow of air through said air flow passageway and capable to acquire a plurality of positions corresponding to different air flow rates through air flow passageway.

2. An airflow rate regulating device as defined in claim 1, wherein said first airflow rate regulation valve includes a mechanical biasing member for biasing the movable member of said first air flow rate regulation valve toward a certain position.

3. An airflow rate regulating device as defined in claim 2, wherein when the movable member of said first airflow rate regulation valve is in said certain position, said first airflow rate regulation valve closes the air passage through said first air inlet.

4. An airflow rate regulating device as defined in claim 3, wherein said first airflow rate regulation valve includes a seat that is engaged by the movable member of said first airflow rate regulation valve when said first air flow regulation valve is in said certain position.

5. An airflow rate regulating device as defined in claim 4, wherein the movable member of said first airflow regulating valve includes a tapered surface capable of engaging said valve seat when the movable member of said first airflow regulation valve is in said certain position.

6. An airflow rate regulating device as defined in claim 5, wherein said mechanical biasing means includes a lever on which is mounted a weight.

7. An airflow rate regulating device as defined in claim 6, wherein a position of said weight on said lever is adjustable to vary a biasing force exerted by said mechanical biasing member.

8. An airflow rate regulating device as defined in claim 1, wherein said second airflow rate regulation valve includes a mechanical biasing member for biasing the movable member of said second airflow rate regulation valve toward a certain position.

9. An airflow rate regulating device as defined in claim 8, wherein when the movable member of said second airflow rate regulation valve is in said certain position, said second airflow rate regulation valve establishes an air passage through said airflow passageway characterized by a predetermined cross-sectional area.

10. An air flow rate regulating device as defined in claim 9, wherein said second airflow rate regulation valve includes a seat that is engaged by the movable member of said second airflow rate regulation valve when said second airflow regulation valve is in said certain position.

11. An airflow rate regulating device as defined in claim 10, wherein the movable member of said second airflow regulation device includes a tapered surface capable of engaging said valve seat when the movable member of said second airflow rate regulation valve is in said certain position.

12. An air flow rate regulating device as defined in claim 11, wherein said movable member includes an aperture having a cross-sectional area corresponding to said predetermined cross-sectional area.

13. An airflow rate regulating device as defined in claim 12, wherein said mechanical biasing means includes a lever on which is mounted a weight.

14. An air flow rate regulation device as defined in claim 13, wherein a position of said weight on said lever is adjustable to vary a biasing force exerted by said mechanical biasing member.

* * * * *